United States Patent [19]

Ehrend et al.

[11] 3,839,250
[45] Oct. 1, 1974

[54] MASTICATING AGENT FOR NATURAL AND/OR SYNTHETIC RUBBER

[75] Inventors: Helfried Ehrend, Speyer; Klaus Morche, Mannheim; Theo Kempermann, Cologne; Wolfgang Redetzky, Opladen, all of Germany

[73] Assignee: Rhein-Chemie Rheinau GmbH, Mannheim, Germany

[22] Filed: Mar. 19, 1973

[21] Appl. No.: 342,661

[30] Foreign Application Priority Data
Mar. 25, 1972 Germany............................ 2214810

[52] U.S. Cl................ 260/23 R, 252/182, 260/314, 260/752
[51] Int. Cl......................... C08c 11/34, C08c 11/40
[58] Field of Search .......... 260/314, 31.2 MR, 752, 260/23 R; 252/182

[56] References Cited
UNITED STATES PATENTS

| | | | |
|---|---|---|---|
| 2,860,116 | 11/1958 | Pikl.................................. | 260/30.2 |
| 3,256,227 | 6/1966 | Kraus................................. | 260/752 |
| 3,317,446 | 5/1967 | Wilder........................ | 260/31.2 MR |

FOREIGN PATENTS OR APPLICATIONS

| | | | |
|---|---|---|---|
| 835,391 | 5/1960 | Great Britain...................... | 260/314 |

OTHER PUBLICATIONS

Rubber World–Materials & Compounding Ingredients for Rubber, (Bill Publications) (N.Y.), (1968), page 76, TS1890I53.

Primary Examiner—Allan Lieberman
Assistant Examiner—H. H. Fletcher
Attorney, Agent, or Firm—Burgess, Dinklage & Sprung

[57] ABSTRACT

Object of the invention is a composition consisting of a salt of a fatty acid and a metal hemiporphyrazine or tetraazaporphine complex as well as a process for masticating natural and/or synthetic rubber comprising the mentioned composition as a masticating agent.

11 Claims, No Drawings

MASTICATING AGENT FOR NATURAL AND/OR SYNTHETIC RUBBER

It is known that a certain percentage of both natural rubber and also most synthetic rubbers has to be degraded in order to enable essential rubber chemicals to be incorporated quickly and effectively into the rubber polymers. Although, it is already known that numerous synthetic rubbers can be obtained in a viscosity which allows processing without any need for previous degradation, there are still some special applications which require even greater plasticisation.

Although mastication can be carried out purely mechanically, i.e., in the absence of chemical auxiliary agents, on mixing rolls or in kneaders, this is uneconomical because it generally takes a relatively long time and, accordingly, requires a large amount of energy. Also, the required degree of plasticisation cannot always be obtained. In contrast, so-called masticating agents enable the rubbers to be more quickly degraded. The more quickly the masticating agent produces degradation, and the more widely it can be used for all kinds of rubbers, the greater is its value.

It is known that a degradation effect can be obtained by adding to rubbers phenyl hydrazine or one of its derivatives, aryl mercaptans and certain diaryl disulphides. The degrading effect can be increased by iron phthalocyanine (German Pat. No. 1,134,509) or by metal-containing 16-membered cyclic ring compounds in which 8 carbon atoms and 8 nitrogen atoms are arranged in alternation and in which every second nitrogen atom forms a heterocyclic ring with the two adjacent carbon atoms through an optionally substituted bridge member consisting of two atoms, and in which at least some of the heterocyclic rings contain two adjacent nitrogen atoms (German Pat. No. 1,220,123). Reports on the production of compounds such as these can be found in German Pat. specification No. 1,080,243 and in U.S. Pat. No. 2,765,308. The following are a few typical representatives of these tetra-azaporphines and hemiporphyrazines:

Compound B

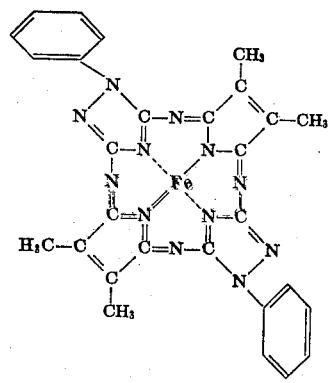

Compound C

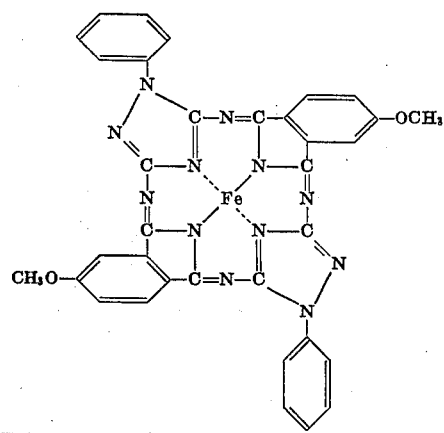

Compound A

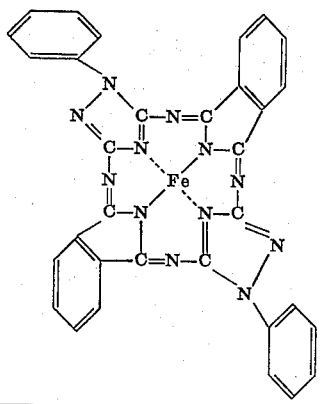

Compound D

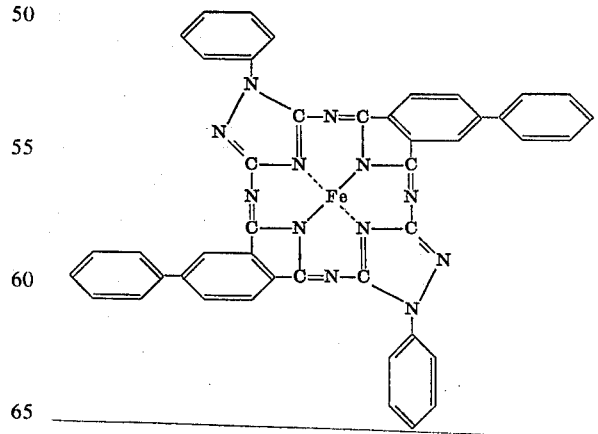

These compounds can also be used in combination with plasticising agents for example, pentachlorothiophenol or its zinc salt.

One of the major disadvantages of using pentachloro thiophenol, for example, in combination with compounds of this kind is the low permitted dosage of these degrading agents. It is virtually impossible to disperse homogeneously in the rubber quantities of the above described compounds A, B, C and D, amounting from 0.00001 to 0.5 percent, based on rubber even when they have been premixed with inert materials in a ratio of up to 1 : 500. Accordingly, an unequally degraded polymer is generally obtained.

Another well-known disadvantage is the fact that a combination of pentachlorothiophenol with the aforementioned metal complexes promotes cyclisation in butadiene-styrene rubbers with increasing degradation temperatures.

Accordingly, there is still considerable interest in finding a masticating agent which can be effectively dispersed in the rubber and which produces uniform degradation.

The rational production of mixtures is at present only possible in cases where the mixing machines (for example internal mixers) run at high speeds. This inevitably produces high temperatures of around 140°C and higher. However, these mixing temperatures should not have any adverse effect upon the resulting rubbers, in other words neither depolymerisation nor cyclisation should occur. Cyclisation would result in very poor dispersion of the mixture as a whole and would lead to inferior physical-mechanical properties.

Accordingly, the object of the invention was to provide a masticating agent which can be quickly mixed in, which can be effectively dispersed in the rubber, which has a very good masticating effect both at normal mixing temperatures and also at high mixing temperatures without producing any signs of cyclisation in the rubber and which does not have any adverse effect upon the finished vulcanisates.

According to the invention, this object is achieved by virtue of the fact that a synergistically acting combination, consisting of a metal salt of a fatty acid and a metal complex of the kind described above, is used as the masticating agent. A particularly effective dispersion is obtained, for example, by mixing zinc oleate with compound B because the zinc oleate not only acts as a carrier for the described metal complexes, but it is also a genuine dispersant. Thus, the combination according to the invention can be mixed and dispersed very effectively in the rubber, even in low dosage. Another advance embodied in using this combination is that it also acts as a dispersant for all the other rubber chemicals present in a rubber mixture. Accordingly, there is no need for the addition of such a separate dispersant. Consequently, there is a genuine saving of effort since the number of additives required in a rubber mixture is reduced.

It was surprisingly found that the synergistically active combination according to the invention does not promote any cyclisation of styrene-butadiene copolymers at high temperatures, unlike for example the combination of pentachlorothiophenol, a conventional degrading agent, with compounds A to D. This represents a particular advantage because it is now possible safely to work at high kneader temperatures and also to degrade blends of styrene-butadiene copolymers with other natural or synthetic rubbers. This fact is of particular significance because blends of styrene-butadiene copolymers both with polyisoprene and with natural rubber and/or polybutadiene are generally used in modern practice. Consequently, the process is simplified because there is no need for the separate degradation of rubbers which are subsequently used again in the blend, which was often necessary according to prior methods.

Accordingly, the invention relates to a process for masticating natural and/or synthetic rubbers, distinguished by the fact that a combination consisting of a metal salt of a fatty acid together with a metal tetraazaporphine or hemi-porphyrazine complex, is added to the rubber which is subsequently mixed and degraded in suitable mixing machines, for example internal mixers, mixing rolls and mixing extruders, at temperatures of from 40°C to 180°C, preferably at temperatures of from 60° to 130°C.

Natural rubber, polyisoprene, polybutadiene, butadienestyrene copolymers, butadiene-acrylonitrile copolymers, etc. can be used as the natural and/or synthetic rubbers, polybutadiene and butadiene-styrene copolymers preferably being used.

Alkaline earth and alkali metals, for example Na, K, Li, Ba, Ca and Mg, also Al, Fe and Zn, preferably zinc, can be used as the metal atom of the fatty acid salt. Suitable fatty acids are organic acids having from 12 to 25 carbon atoms, for example, oleic acid, rapeseed oil fatty acid, tall oil fatty acid, stearic acid, lauric acid, linoleic acid, abietic acid and erucic acid. It is preferred to use oleic acid, abietic acid, erucic acid, tall oil fatty acid and reapeseed oil fatty acid. Particularly preferred metal salts include the zinc salt of rapeseed oil fatty acid, oleic acid, abietic acid, tall oil fatty acid and of erucic acid and also barium and lithium tallate.

The metal complexes are tetra-azaporphines or hemi-porphyrazines corresponding to the formula

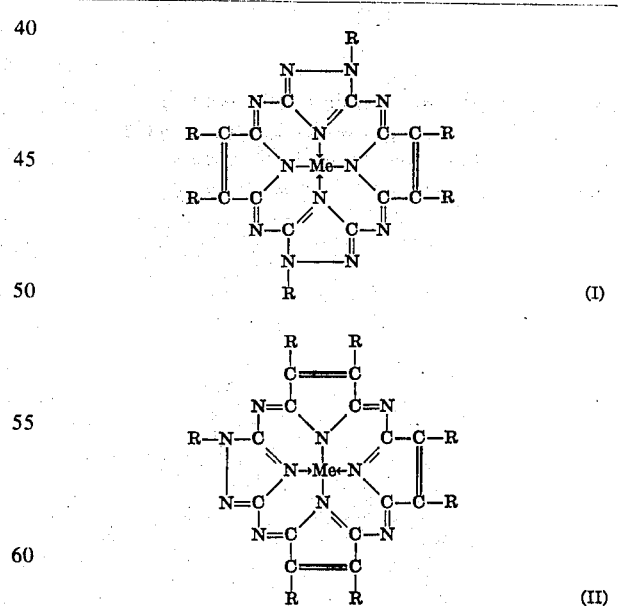

in which Me represents a metal atom which is at least divalent whilst the radicals R represent alkyl-, aryl- or cycloalkyl-radicals, which can also form in pairs optionally substituted carbocyclic or heterocyclic rings.

The compounds contain metals such as iron, cobalt, nickel, chromium, manganese, zinc, aluminium and magnesium, preferably iron. The preparation of substances such as these is described in German Pat. specification No. 1,080,243. Compounds A, B, C and D are preferably used.

The combinations according to the invention contain from 0.002 to 2 percent by weight, preferably from 0.05 to 0.5 percent by weight or metal complex, based on the salt of a fatty acid.

The combination is introduced into the rubbers in quantities of from 0.5 to 4 percent by weight and preferably in quantities of from 1 to 3 percent by weight, based on the rubber.

The following Examples are intended to describe the effect of the combinations according to the invention without limiting them thereto. The percentages appearing in the composition of the combinations are percent by weight.

Example 1

Table 1

| 1 | 2 | 3 | 4 | 5 | 6 |
|---|---|---|---|---|---|
| Degrading agent polyisoprene degraded on mixing rolls at 100°C | no addition | Zn-oleate | compound A | combination of Zn-oleate 99.824 % Compound A 0.176 % | combination of pentachlorothio phenol 99.83% compound A 0.17% |
| Dosage in percent by weight (based on rubber) | — | 1 | 0.176 | 1 | 0.2 |
| Mooney plasticity after 0 mins. | 94 | | | | |
| 10 mins. | 71 | 40 | 21 | 19 | 33 |
| 20 mins. | 55 | 23 | 14 | 12 | 25 |
| Defo plasticity after 0 mins. | 3600/45 | | | | |
| 20 mins. | 750/22 | 200/10 | 120/8 | 80/6 | 300/18 |
| Wallace plasticity after 0 mins. | 62 | | | | |
| 20 mins. | 30 | 14 | 10 | 8 | 16 |

Example 2

Table 2

| 1 | 2 | 3 | 4 | 5 | 6 | 7 | 8 | 9 |
|---|---|---|---|---|---|---|---|---|
| Degrading agent smoked sheets degraded on mixing rolls at 80°C | no addition | Zn-salt of oleic acid | Zn-salt of abietic acid | Zn-salt of erucic acid | compound B | combination of the zinc salt of oleic acid 99.85 % compound B 0.15 % | combination of zinc salt of abietic acid 99.85 % compound B 0.15 % | combination of the zinc salt of erucic acid 99.85 % compound B 0.15 % |
| Dosage in percent by weight (based on rubber) | — | 2 | 2 | 2 | 0.3 | 2 | 2 | 2 |
| Defo plasticities (DH/DE) after 10 mins. | 3200/48 1850/36 | 1000/25 | 1175/23 | 1375/28 | 400/20 | 225/12 | 250/15 | 300/13 |
| 20 mins. | 1275/25 | 550/16 | 525/12 | 625/17 | 300/16 | 150/9 | 175/10 | 225/9 |

Example 3

Table 3

| 1 | 2 | 3 | 4 | 5 | 6 |
|---|---|---|---|---|---|
| Degrading agent polybutadiene degraded on mixing rolls at 100°C | no addition | Zn-oleate | compound A | combination of Zn-oleate 99.83 % compound A 0.17 % | combination of pentachlorothio phenol 99.80 % compound A 0.20 % |
| Dosage in percent by weight (based on rubber) | — | 3 | 0.51 | 3 | 1.5 |
| Mooney plasticity after 0 mins. | 50 | | | | |
| 10 mins. | 52 | 47 | 46 | 38 | 42 |
| 20 mins. | 52 | 44 | 44 | 32 | 39 |
| Defo plasticity after 0 mins. | 900/35 | | | | |
| 20 mins. | 900/35 | 825/33 | 825/36 | 575/32 | 650/34 |
| Wallace plasticity after 0 mins. | 29 | | | | |
| 20 mins. | 31 | 27 | 29 | 22 | 25 |

Example 4

Table 4

| 1 | 2 | 3 | 4 | 5 | 6 | 7 | 8 | 9 |
|---|---|---|---|---|---|---|---|---|
| Degrading agent styrene rubber degraded on mixing rolls at 80°C | no addition | Li-salt of tall oil fatty acid | Zn-salt of tall oil fatty acid | Ba-salt of tall oil fatty acid | compound D | combination of Li-tallate 99.83 % Compound D 0.17 % | combination of Zn-tallate 99.83 % compound D 0.17 % | combination of Ba-tallate 99.83% compound D 0.17% |
| Dosage in percent by weight (based on rubber) | — | 2 | 2 | 2 | 0.35 | 2 | 2 | 2 |
| Defo plasticity (DH/DE) after | 1450/47 | | | | | | | |
| 10 mins. | 1400/43 | 1000/38 | 1100/38 | 1100/38 | 1300/45 | 925/36 | 950/34 | 900/35 |
| 20 mins. | 1325/39 | 925/36 | 975/38 | 950/36 | 1150/40 | 875/35 | 850/32 | 800/32 |

Example 5

Table 5

| 1 | 2 | 3 | 4 | 5 | 6 | 7 | 8 |
|---|---|---|---|---|---|---|---|
| Degrading agent styrene rubber degraded on mixing rolls at 125°C | no addition | Zn-oleate | compound B | compound C | combination of Zn-oleate 99.83 % compound B 0.17 % | combination of Zn-oleate 99.83 % compound C 0.17 % | combination of Zn-pentachlorothio phenol 99.83 % compound C 0.17 % |
| Dosage in percent by weight (based on rubber) | — | 3 | 0.53 | 0.53 | 3 | 3 | 1.5 |
| Defo plasticity (DH/DE) after | | | | | | | |
| 0 mins. | 1025/35 | | | | | | |
| 20 mins. | 1125/35 | 1050/32 | 975/34 | 875/34 | 850/30 | 800/29 | 1325/51 |
| Wallace plasticity after | | | | | | | |
| 0 mins. | 28 | | | | | | |
| 20 mins. | 27 | 25 | 26 | 25 | 24 | 23 | 56 |
| Mooney plasticity after | | | | | | | |
| 0 mins. | 50 | | | | | | |
| 10 mins. | 42 | 38 | 41 | 40 | 36 | 36 | 31 |
| 20 mins. | 39 | 36 | 39 | 39 | 34 | 32 | 56 |

Example 6

Table 6

| 1 | 2 | 3 | 4 | 5 |
|---|---|---|---|---|
| Degrading agent styrene rubber degraded on mixing rolls | no addition | Zn-oleate | combination of Zn-oleate 99.83 % compound A 0.17 % | combination of pentachlorothiophenol 99.83 % compound A 0.17 % |
| Dosage in percent by weight (based on rubber) | — | 3 | 3 | 1.5 |
| Degradation temperature °C | 60 100 140 | 60 100 140 | 60 100 140 | 60 100 140 |
| Mooney plasticity after | | | | |
| 0 mins. | 55 | | | |
| 10 mins. | 48 48 47 | 42 43 45 | 41 40 42 | 40 37 53 |
| 20 mins. | 46 47 66 | 41 42 41 | 38 38 36 | 40 42 91 |
| Defo plasticity (DH/DE) after | | | | |
| 0 mins. | 950/34 | | | |
| 20 mins. | 975/34 | 1025/1300/33 47 | 800/925/975/31 30 32 | 750/875/900/30 31 34 | 800/1025/3000/31 42 63 |
| Wallace plasticity after | | | | |
| 0 mins. | 28 | | | |
| 20 mins. | 28 30 25 | 25 26 37 | 24 23 21 | 25 24 63 |

Table 1 shows plasticity measurements carried out on polyisoprene before and after a degradation test on mixing rolls at 100°C. The plasticity measurements were made in accordance with Mooney (DIN 53, 523), Badder (DIN 53, 514) and Wallace. According to all three measuring techniques, the combination of zinc oleate with 0.176 percent of compound A shows lower plasticity values in comparison with the individual components (columns 3 and 4) used in the same concentration.

A combination of pentachlorothiophenol with compound A, co-tested for comparison, produces distinctly inferior plasticity values than the combination according to the invention (column 5) in the dosage normally used for this combination (column 6). Thus, the Defo-elastic component in the degradation test of column 6 appears to be particularly favourable.

Table 2 describes the advantageous effect of the combinations according to the invention, consisting of a zinc salt of various fatty acids and of the metal complex compound A, in comparison with the individual components in the degradation of smoked sheets.

Table 3 shows plasticity measurements carried out on a polybutadiene produced using titanium catalysts. The synergism regarding the degradation behaviour of zinc oleate with compound A is shown particularly clearly in Table 3. Thus, the plasticity values in column 5 are considerably more favourable than those in columns 3 and 4. The plasticity values obtained with a combination of pentachlorothiophenol with compound A are also inferior to those obtained with the claimed combination. The zinc oleate combination is also similarly effective in other types of polybutadienes, for example cobalt-type polybutadiene.

Table 4 shows the results of degradation tests carried out at a mixing-roll temperature of 80°C using a relatively high molecular weight butadiene-styrene rubber which shows an initial plasticity of approximately 80 ML 1 + 4/100°C. In this case, too, there is clear evidence of the advantage of the use of the combination according to the invention consisting of the salt of a fatty acid and the metal complexes specified, over the use of the individual components.

Table 5 shows the degradation behaviour of a cold-polymerised butadiene-styrene copolymer of the SBR-1500 type. The synergistic effect of the zinc oleate combination (columns 6 and 7) in relation to the individual components (columns 3 and 5) is clear in this case as well. The co-tested combination with pentachlorothiophenol produces the opposite effect in this elastomer, i.e., the material cyclises.

Totally different behaviour is surprisngly found when using the zinc oleate combinations (columns 6 and 7). In this case cyclisation does not occur, instead this combination again shows the already mentioned synergistic effect.

Table 6 shows the results of peptising tests which are particularly intended to emphasize the difference demonstrated in Example 5 in regard to the cyclising effect between the zinc oleate combination and the combination with pentachlorothiophenol. Thus, cyclisation is governed to a considerable extend by the degradation temperature and is particularly noticeable at 140°C (column 5). However, even the rubber without any additions (column 2) shows some signs of cyclisation (Defo at 140°C : 1300/47). By contrast, satisfactory plasticity values are surprisingly found using the zinc oleate combination (column 4), being even more favourable than in the case of pure zinc oleate (column 3).

What we claim is:

1. In the degrading of a rubber selected from the group consisting of natural rubber, polyisoprene, polybutadiene, butadiene-styrene copolymers and butadiene-acrylonitrile copolymers comprising mixing said rubber with a masticating agent and degrading said mixture at a temperature of about 40° to 180°C, the improvement which comprises employing as said masticating agent about 0.5 to 4 percent by weight of the rubber of a combination consisting essentially of a salt of a fatty acid of about 12 to 25 carbon atoms and about 0.002 to 2 percent by weight of said salt of a metal hemiporphyrazine or tetra azaporphine complex.

2. A process as claimed in claim 1, wherein the salt of a fatty acid is an alkali, alkaline earth, aluminium, iron or zinc salt of a fatty acid having from 14 to 25 carbon atoms.

3. A process as claimed in claim 1, wherein the metal hemiporphyrazine or tetra azaporphine complex is an iron hemiporphyrazine or a tetra azaporphine.

4. A process as claimed in claim 1, wherein the mixing is carried out at a temperature in the range of from 60°C to 130°C.

5. A process as claimed in claim 2, wherein the salt of a fatty acid is the zinc salt of rapeseed oil fatty acid, oleic acid, abietic acid, tall oil fatty acid or erucic acid.

6. A process as claimed in claim 2, wherein the salt of a fatty acid is barium or lithium tallate.

7. A process as claimed in claim 1, wherein the combination comprises 0.05 to 0.5 percent by weight of the metal complex based on the salt of the fatty acid.

8. A process as claimed in claim 1, wherein the combination is introduced into the rubber in a quantity of from 1 to 3 percent by weight based on the rubber.

9. A rubber mixture comprising at least one rubber selected from the group of natural rubber, polyisoprene, polybutadiene, butadiene-styrene copolymers and butadieneacrylonitrile copolymers and incorporated therein about 0.5 to 4 percent by weight of the rubber of a combination consisting essentially of a metal salt of a fatty acid of about 12 to 25 carbon atoms and about 0.002 to 2 percent by weight of said salt of a metal hemiporphyrazine or tetra azaporphine complex.

10. A rubber mixture as claimed in claim 9, comprising at least one of synthetic and natural rubber and an alkali, alkaline earth, aluminium, iron or zinc salt of a fatty acid having from 14 to 25 carbon atoms together with an iron hemiporphyrazine or tetra azaporphine complex.

11. A rubber mixture as claimed in claim 9, wherein the combination is incorporated in a quantity of from 0.5 to 4 percent by weight based on the rubber.

* * * * *